United States Patent [19]
Ziegra et al.

[11] Patent Number: 5,619,183
[45] Date of Patent: Apr. 8, 1997

[54] VIDEO AUDIO DATA REMOTE SYSTEM

[75] Inventors: Richard C. Ziegra, 1511 Coronach Ave., Sunnyvale, Calif. 94087; Steven C. Hurtado, Cupertino, Calif.

[73] Assignee: Richard C. Ziegra, Sunnyvale, Calif.

[21] Appl. No.: 304,679

[22] Filed: Sep. 12, 1994

[51] Int. Cl.$^6$ ................................................. G08B 26/00
[52] U.S. Cl. ................ 340/505; 340/506; 340/531; 340/286.01; 348/143; 455/53.1; 379/35; 379/38
[58] Field of Search .................................... 340/505, 506, 340/517, 531, 538, 825.24, 825.25, 286.01, 286.07; 348/143; 455/53.1; 379/35, 38

[56] References Cited

U.S. PATENT DOCUMENTS

| | | | |
|---|---|---|---|
| 3,798,796 | 3/1974 | Stauff et al. | 348/143 |
| 4,251,691 | 2/1981 | Kakihara et al. | 179/2 |
| 4,845,636 | 7/1989 | Walker | 364/479 |
| 4,847,894 | 7/1989 | Chanvin et al. | 379/104 |
| 4,965,819 | 10/1990 | Kannes | 379/53 |
| 5,010,399 | 4/1991 | Goodman et al. | 358/85 |
| 5,164,979 | 11/1992 | Choi | 379/40 |
| 5,200,827 | 4/1993 | Hauson et al. | 359/146 |
| 5,202,759 | 4/1993 | Laycock | 358/108 |
| 5,382,943 | 1/1995 | Tanaka | 348/143 |

*Primary Examiner*—Jeffery Hofsass
*Assistant Examiner*—Daryl C. Pope
*Attorney, Agent, or Firm*—D'Alessandro & Ritchie

[57] ABSTRACT

A method and system for remote assistance and review of an operator working with complex equipment. An operator at a station at a local site is coupled to an advisor at a station at a remote site, so that the advisor may view and hear the same stimuli as the operator, that the advisor and operator may communicate, and that the advisor may view and control the local apparatus. The operator has limited training or otherwise in need of support, and may be a field engineer or technician. The advisor has extensive training and able to provide technical support, and generally has extended and specialized knowledge with regard to the local apparatus, and may be a technical expert on the local apparatus. The operator may comprise an individual with technical training and knowledge, but lacking managerial or other authority, while the advisor comprises an individual with such authority. The operator communicates with the advisor by visual cues or ordinary speech, while the advisor views and listens to the local apparatus. The advisor gives advice to the operator for manipulating the local apparatus, and manipulates the local apparatus directly by means of the control signal or data signal feeds. Thus, the operator may operate the local apparatus as if the advisor were peeking over his shoulder; viewed alternatively, the advisor may operate the local apparatus as if the operator were an intelligent waldo. Alternatively, an intermediate advisor may advise/control the operator and be advised/controlled by a high-level advisor.

20 Claims, 6 Drawing Sheets

VIDEO AUDIO DATA REMOTE SYSTEM

BACKGROUND OF THE INVENTION

1. Field of the Invention

This invention relates to a video audio data remote system.

2. Description of Related Art

The nature of business organizations and their employees is generally such that, in most any subject, there are a relatively small number of persons with extensive training and experience (e.g., "experts") and a relatively large number of persons with only limited training and experience (e.g., "technicians"). This problem is exacerbated by the relatively larger costs associated with the former. Accordingly, when a business organization seeks to apply a person's skills to a problem, it is often faced with the fact that persons with extensive training and skill are a scarce resource.

With many problems, and in particular with the problem of servicing and trouble-shooting equipment (especially electrical equipment), experience shows that most tasks require only a subset of the full experience that characterizes experts in the field, and that those tasks can be adequately carried out by technicians. However, when a technician is confronted with a task requiring an expert, often the only indicator thereof is the technician's inability to solve the problem. Sometimes, the technician's lack of extensive knowledge can actually make the problem worse. These effects serve to increase the cost, time, effort, and frustration associated with servicing and trouble-shooting equipment.

One method of the prior art has been to instruct technicians in the techniques of servicing and trouble-shooting equipment, and in the additional technique of summoning an expert when the technician's efforts reach a defined level of cost, time, or frustration. This method achieves the effect of better utilizing both experts and technicians as resources, but has the drawback that it leads to added cost when the problem is one that requires an expert from the start. It can also result in substantial customer dissatisfaction when a problem requiring only a few minutes (for an expert) requires a plurality of service calls and consequent large costs or delays.

Accordingly, it would be advantageous to provide a method and system by which technicians can perform the tasks they are adequately trained for, while allowing experts to assist them when expert assistance is required.

SUMMARY OF THE INVENTION

The invention provides a method and system for remote assistance and review of an operator working with complex equipment. In a preferred embodiment, an operator manning a local station at a local site is coupled to an advisor manning a remote station at a remote site (where "local" and "remote" are relative to a local apparatus being controlled by the operator, and do not necessarily denote large distance), in such manner that the advisor may view and hear the same stimuli as the operator, that the advisor and operator may communicate, and that the advisor may view and control the local apparatus.

In a preferred embodiment, a local station at the local site may be coupled by communication link(s) to a remote station at a remote site. The local station comprises a video and audio sensor, such as a camera and a microphone, a control for the local apparatus, such as a control signal or data signal feed coupled thereto, and a receiver for the communication link with the remote station, such as an earphone or speaker. The communication link comprises a communication path to/from the remote station, and may further comprise data encoding, compression, and error correction/detection devices. The remote station comprises a video and audio display, such as a monitor and a speaker, a transducer for controls for the local apparatus, a database of topical information, and a transmitter for the communication link with the remote station, such as a microphone.

In a preferred embodiment, the operator may comprise an individual with limited training or otherwise in need of support, such as a field engineer or technician. The operator should generally know how to operate the local apparatus, but need not have extended or specialized knowledge with regard thereto. The advisor may comprise an individual with extensive training and able to provide technical support, who generally does have extended and specialized knowledge with regard to the local apparatus, such as a technical expert on the local apparatus. In an alternative embodiment, the operator may comprise an individual with technical training and knowledge, but lacking managerial or other authority, while the advisor comprises an individual with such authority.

In a preferred embodiment, the operator couples the local station to the local apparatus and to the communication link with the remote station. The operator may communicate with the advisor by visual cues or ordinary speech, while the advisor may view and listen to the local apparatus. The advisor may give advice to the operator for manipulating the local apparatus, and may manipulate the local apparatus directly by means of the control signal or data signal feeds. Thus, the operator may operate the local apparatus as if the advisor were peeking over his shoulder; viewed alternatively, the advisor may operate the local apparatus as if the operator were an intelligent waldo.

In an alternative embodiment, an intermediate advisor may advise/control the operator and be advised/controlled by a high-level advisor.

DESCRIPTION OF THE PREFERRED EMBODIMENT

In the following description, a preferred embodiment of the invention is described with regard to preferred process steps and data structures. However, those skilled in the art would recognize, after perusal of this application, that embodiments of the invention may be implemented using a set of general purpose computers operating under program control, and that modification of available general purpose computers to implement the process steps and data structures described herein would not require undue invention.

GENERAL FEATURES OF THE METHOD AND SYSTEM

Figure 1:
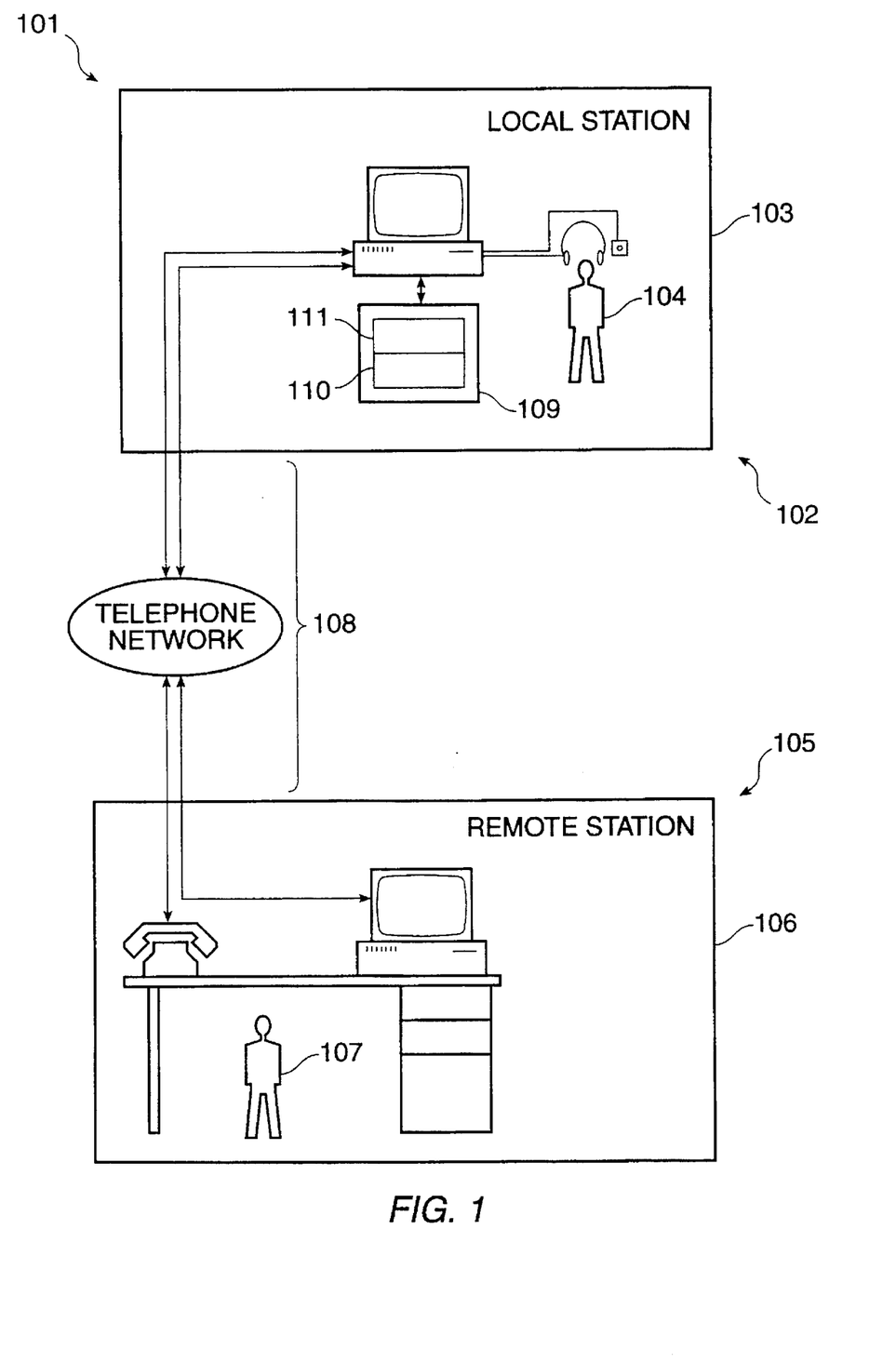
FIG. 1 shows a block diagram of a remote system.

FIG. 1 shows a block diagram of a remote system.

A remote system 101 comprises a local station 102 at a local site 103, operated by a local operator 104, and a remote station 105 at a remote site 106 operated by a remote advisor 107, the local station 102 and the remote station 105 being coupled by a communication link 108.

The local station 102 is coupled to local apparatus 109, such as for example a set of test equipment 110 and a device under test 111. Although the local apparatus 109 is generally described herein as a physical device, it may occur that the local apparatus 109 is a virtual device, a simulation, or a software object implemented using a processor and controlled by means of control signals and data signals.

As described herein, the local operator 104 may operate the local apparatus 109, with the advice and control of the remote advisor 107:

(a) The remote advisor 107 may view and hear the same stimuli at the local site 103 (with regard to the local apparatus 109) as the local operator 104, by means of sensors at the local station 102 and the communication link 108.

(b) The local operator 104 may communicate with the remote advisor 107, by means of the communication link 108.

(c) The remote advisor 107 may operate the local apparatus 109 directly, by means of transducers at the local station 102 and the communication link 108.

As used herein, "local" and "remote" are relative to logical control of the local apparatus 109, and do not necessarily denote large distance. For example, the local station 102 and the remote station 105 may be located in the same building or even the same room, where it is desired to logically separate the function of the local operator 104 and the remote advisor 107. Similarly, the local operator 104 need not by physically colocated with the local apparatus 109, where it is desired to control that local apparatus 109 by means of physically distant tools.

In a preferred embodiment, the test equipment 110 comprises a programmable unit, such as the TDS 460 oscilloscope, product, the DM 2510G, DVM, and an AWG 2020 function generator, all products by Tektronix Corporation, of Wilsonville, Oreg. The oscilloscope may be configured to determine a amplitude and frequency of vibration of an object at the local station 102, so as to enable troubleshooting of automotive engines and other equipment with vibration modes.

THE LOCAL STATION

Figure 2:
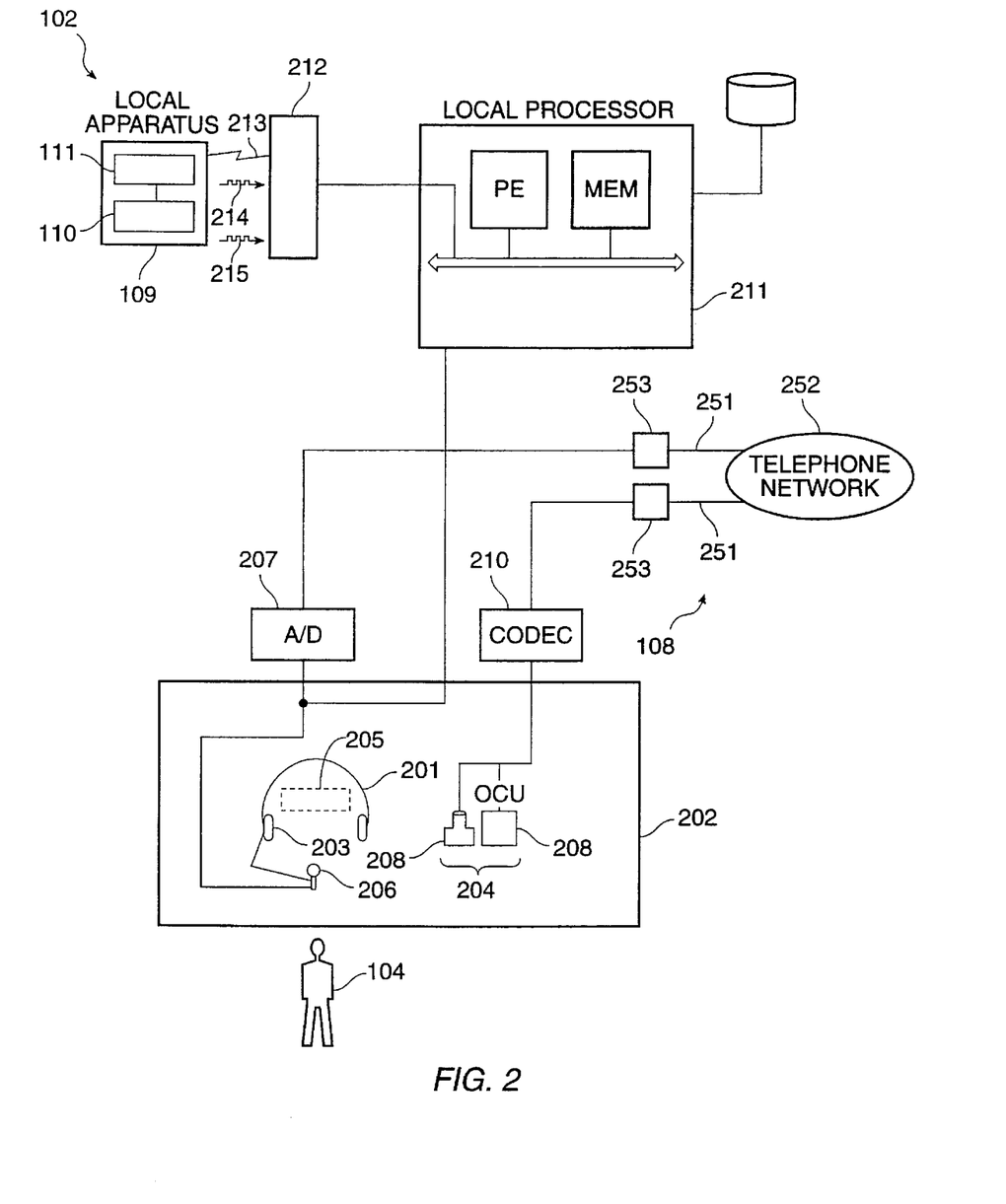
FIG. 2 shows a block diagram of an local station for a remote system.

FIG. 2 shows a block diagram of an local station for a remote system.

The local station 102 comprises an operator headset 201, including a set of audio and video sensors 202. In a preferred embodiment, the audio and video sensors 202 comprise a set of earphones 203 disposed so the local operator 104 can hear, a camera 204 disposed to point toward the local operator's field of view as the local operator 104 moves, a heads-up display 205 disposed so the local operator can see it, and a microphone 206 disposed so the local operator 104 can speak into it.

In a preferred embodiment, the operator headset 201 comprises a set of headgear or a helmet suitable for wearing by the local operator 104, having the audio and video sensors 202 attached thereto or embedded therein, in suitable locations relative to the local operator's ears, eyes, and mouth. For example, the earphones 203 are preferably disposed near the local operator's ears, the camera 204 is preferably disposed near the side of the local operator's head and pointed ahead at a center-of-vision line relative to the local operator's head, the heads-up display 205 is preferably disposed slightly to the right or left of the center-of-vision line and slightly above the local operator's eye level, and the microphone 206 is preferably disposed near the local operator's mouth.

In a preferred embodiment, the earphones 203 comprise the NHM-200 product, by Nady Systems, Inc., of 6701 Bay Street, Emeryville, Calif. 94608.

In a preferred embodiment, the camera 204 comprises a headset-mountable microcamera 208 with an independent camera control device 209, such as the IK-C40A product, by Toshiba America, C. P., Inc., of Buffalo Grove, Ill. The microcamera 208 is preferably a high-resolution low-noise camera, about 38.9 millimeters (1 9/16 inches) long, about 17 millimeters (11/16 inches) in diameter, and about 16 grams (0.5 ounce) in weight, preferably comprises a 12.7 millimeter (½ inch) 410,000 pixel CCD providing 460 lines of horizontal resolution, with a minimum illumination of about ten lux at F-stop 1.6, and preferably produces a continuous analog video signal in an NTSC format.

In a preferred embodiment, the microcamera 208 and camera control device 209 can be configured to alternatively provide high-resolution still photographic images in place of continuous video images, represented by an analog video signal in a standard format.

An output of the microcamera 208 is coupled to a local video codec 210, which digitizes the video signal output by the microcamera 208, to produce a stream of digital video data. In a preferred embodiment, the local video codec 210 also compresses the digital video data, preferably by a factor of about 100:1, using a full color motion compression technique performed in real time. In a preferred embodiment, the local video codec 210 uses the "PV2" video compression standard, by Compression Labs, Inc., of San Jose, Calif., and comprises the "Cameo 2000" product, also by Compression Labs, Inc., of San Jose, Calif. However, in an alternative embodiment, the local video codec 210 may use another video compression standard, such as the MPEG I or MPEG II compression standard. The MPEG I and or MPEG II compression standards are known in the art.

In a preferred embodiment, the heads-up display 205 comprises the "Headsup Shield" product, by RZ Associates, of Mountain View, Calif. The heads-up display 205 comprises a liquid crystal diode (LCD) display, disposed near the local operator's eye to have an apparent (i.e., illusory) size about equivalent to a 60-inch diagonal television screen. LCD displays with illusory size are known in the art. The LCD display may comprise any standard LCD heads-up display, such as the 2-inch LCD Monitor system, made by Sony Corporation, Inc., of Tokyo, Japan.

In a preferred embodiment, the microphone 206 comprises a voice-actuated microphone, such as the MCM-400 Camcorder Microphone product, by Nady Systems, Inc., of 6701 Bay Street, Emeryville, Calif. 94608. However, in an alternative embodiment, a continuously active microphone or a control-activated microphone would also be workable.

An output of the microphone 206 preferably produces a continuous analog audio signal in a standard format. The analog audio signal is preferably coupled directly to a portion of the communication link 108 (e.g., a separate analog audio telephone line). However, in an alternative embodiment, the analog audio signal is coupled to an audio A/D circuit 207, which digitizes the analog audio signal using a known digital format for audio signals and generates a sequence of digital audio data.

The local station comprises a local processor 211 coupled to the local apparatus 109, to the audio and video sensors 202, and to the communication link 108.

In a preferred embodiment, the local processor 211 comprises a 19 inch rack mounted computer with dimensions about 40 inches by 24 inches by 20 inches, having at least 16 MB of memory (and preferably at least 32 MB of memory), at least 240 MB of mass storage such as a hard disk, a ThinNet connection, and a ThinNet to GPIB controller 212 capable of logical connection to IEEE 488 instruments. For example, the local processor 211 may comprise the Quadra 660AV/16 product, by Apple Corporation, of Cupertino, Calif., operating under software control, such as under control of "System 7" software, also by Apple Corporation, of Cupertino, Calif.

However, in an alternative embodiment, the local processor 211 may comprise a separately mounted processor, an IBM PC compatible processor, a processor using an Apple Corporation architecture but having a different CPU element such as the Quadra 8100 with a Power PC 604 chip, or a general purpose processor having another architecture. Those skilled in the art would recognize, after perusal of this application, that modification of such an alternative embodiment for the local processor 211 would be workable with the disclosure of the present invention, and would not require any undue invention.

In a preferred embodiment, the ThinNet to GPIB controller 212 comprises a controller card coupled to a local internal bus 266 of the processor 211, such as the GPIB-ENET product, by National Instruments, Inc., of Austin, Tex. The ThinNet to GPIB controller 212 controls a standard GPIB interface 213 between the processor 211 and the local apparatus 109, such as an interface conforming to the IEEE 488.2 standard. The IEEE 488.2 standard is known in the art.

However, in an alternative embodiment, the processor 211 may be coupled to the local apparatus 109 by means of a direct serial connection of another design, by means of a VMI bus extension unit or other bus extension interface, by means of a local area network or wide area network, or by means of another type of connection. It would be clear to those skilled in the art that these alternative embodiments would be workable, that modification of such an alternative embodiment for the local processor 211 would be workable with the disclosure of the present invention, and would not require any undue invention.

In a preferred embodiment where the local apparatus 109 comprises test equipment 110 and devices under test 111, the local processor 211 controls the test equipment 110, and thereby control the devices under test 111, by means of a control signal link 214 and a data signal link 215, preferably both implemented by means of the GPIB interface 213. For example, where the test equipment 110 comprises an oscilloscope, the control signal link 214 comprises a plurality of signal lines coupled to the operator controls for the oscilloscope by means of the GPIB interface 213.

The local processor 211 couples the local apparatus 109 to the communication link 108. In a preferred embodiment where the local apparatus 109 comprises test equipment 110 comprising an oscilloscope, the local processor 211 couples video signals output by the oscilloscope to the communication link 108, by means of the GPIB interface 213. Where appropriate, the processor 211 may perform data compression, error detection and correction for audio and video signals transmitted from the local apparatus 109 and the communication link 108. In a preferred embodiment, data compression may be configured to known data formats used by the local apparatus 109.

The local processor 211 operates the video controls for the camera 204, preferably by means of a camera control link 216 to the camera control device 209.

The local processor 211 couples the audio and video sensors 202 to the communication link 108. In a preferred embodiment, the local processor 211 is coupled to the operator headset 201 by means of a cable, preferably at least 15 feet long. Where appropriate, the local processor 211 performs data compression in addition to that performed by the local video codec 210, error detection and correction for audio and video signals transmitted between the audio and video sensors 202 and the communication link 108.

The local processor 211 packages signals from the local apparatus 109 and the audio and video sensors 202 into a set of packets, and multiplexes that set of packets onto the communication link 108. Packaging signals into packets and multiplexing packets are known in the art. Where the communication link 108 comprises a plurality of channels, the local processor 211 allocates packets and signals to those channels for transmission and receipt. For example, in a preferred embodiment, the communication link 108 comprises two telephone lines; the local processor 211 allocates analog audio signals to one of those two telephone lines, and all other signals to the other of those two telephone lines. However, in an alternative embodiment, the local processor 211 may allocate signals to one or more channels of the communication link 108 in response to each signal's bandwidth requirements, priority, quality requirements, security or signal integrity requirements, and in response to other factors known in the communication arts.

In a preferred embodiment, there are a plurality of local stations 102, each with its own local processor 211. Each local processor 211 communicates with the remote station 105 to resolve any communication conflicts between local stations 102, by means of communication conflict resolution techniques known in the communication arts.

THE COMMUNICATION LINK

In general, the communication link 108 may comprise any link capable of carrying sufficient information between the local station 102 and the remote station 105, such as a dedicated communication link, a local network, a wide area network, or some other communication system. In a preferred embodiment, the communication link 108 comprises a set of (preferably two) ISDN telephone links 251 coupled to a telephone switching network 252. However, it will be clear to those skilled in the art, after perusal of this application, that the communication link 108 may comprise an Ethernet connection, and IEEE token ring connection, a ThinNet AUI connection, or another type of local network or wide area network connection.

There is no particular requirement that the communication link 108 must be a continuous or dedicated communication link. Bandwidth requirements may promote the use of a wide-band interface that is continually operated, but it is also possible in some applications for the communication link 108 to comprise telephone links 251 that are logically connected and disconnected on a dynamic basis, under the control of the local processor 211 or another processor.

In a preferred embodiment, the local processor 211 is coupled to the telephone links 251 by means of a set of modems 253, such as the Optima 28800 V.FC fax product, by Hayes Microcomputer Products, Inc., of Atlanta, Ga. In a preferred embodiment, the local processor 211 controls coupling and decoupling of the telephone links 251 by commands to the modems 253, preferably using a standard modem command set such as the Hayes modem command set, and standard modem software, such as the "Apple Modem" software, by Apple Corporation, of Cupertino, Calif.

In a preferred embodiment, the local processor 211 comprises a first local serial port 261 coupled to the local video codec 210 and disposed to receive compressed digitized video signals from the local video codec 210. The local processor 211 couples the video data received from the local video codec 210 at the first local serial port 261 to a second local serial port 262 coupled to one of the modems 253 coupled to one of the telephone links 251. Video data received from the local video codec 210 at the first local serial port 261 is coupled to a video data software controller 263, packaged into a set of packets for communication, coupled to the second local serial port 262, and encoded by a selected modem 253 for transmission on a selected telephone link 251.

In a preferred embodiment, the video data software controller 263 comprises the "Cameo tool" software, by Compression Labs, Inc., of San Jose, Calif., and provided with the "Cameo 2000" product, also by Compression Labs, Inc., of San Jose, Calif.

In a preferred embodiment, the local processor 211 comprises a software pseudo driver 264 emulating a third local serial port 265 (i.e., the software pseudo driver 264 provides a "pseudo serial port"). Software pseudo drivers and pseudo serial ports are known in the art. When data from the local apparatus 109 is received from the GPIB interface 213, it is coupled to the ThinNet to GPIB controller 212, coupled to the local internal bus 266 in the local processor 211. The data is coupled from the local internal bus 266 to a local GPIB control program 267, which controls the ThinNet to GPIB controller 212 and the GPIB interface 213. The data is coupled by the local GPIB control program 267 to the software pseudo driver 264, coupled by the software pseudo driver 264 to the first local serial port 261, packaged by the video data software controller 263 into a set of packets for communication, coupled to the second local serial port 262, encoded by a selected modem 253, and transmitted on a selected telephone link 251.

In a preferred embodiment, the software pseudo driver 264 comprises the "VADRS pseudo driver" software, by RZ Associates, of Mountain View, Calif. Those skilled in the art would recognize, after perusal of this application, that construction of a software pseudo driver to perform the tasks described herein would be workable, and would not require any undue invention.

In a preferred embodiment, the local GPIB control program 267 comprises the "LabView" software, by National Instruments, Inc., of Austin, Tex. The local GPIB control program 267 provides control elements for reading and setting controls for the local apparatus 109, and reading signals from and displaying data from the local apparatus 109. GPIB control programs are known in the art.

THE REMOTE STATION

Figure 3:
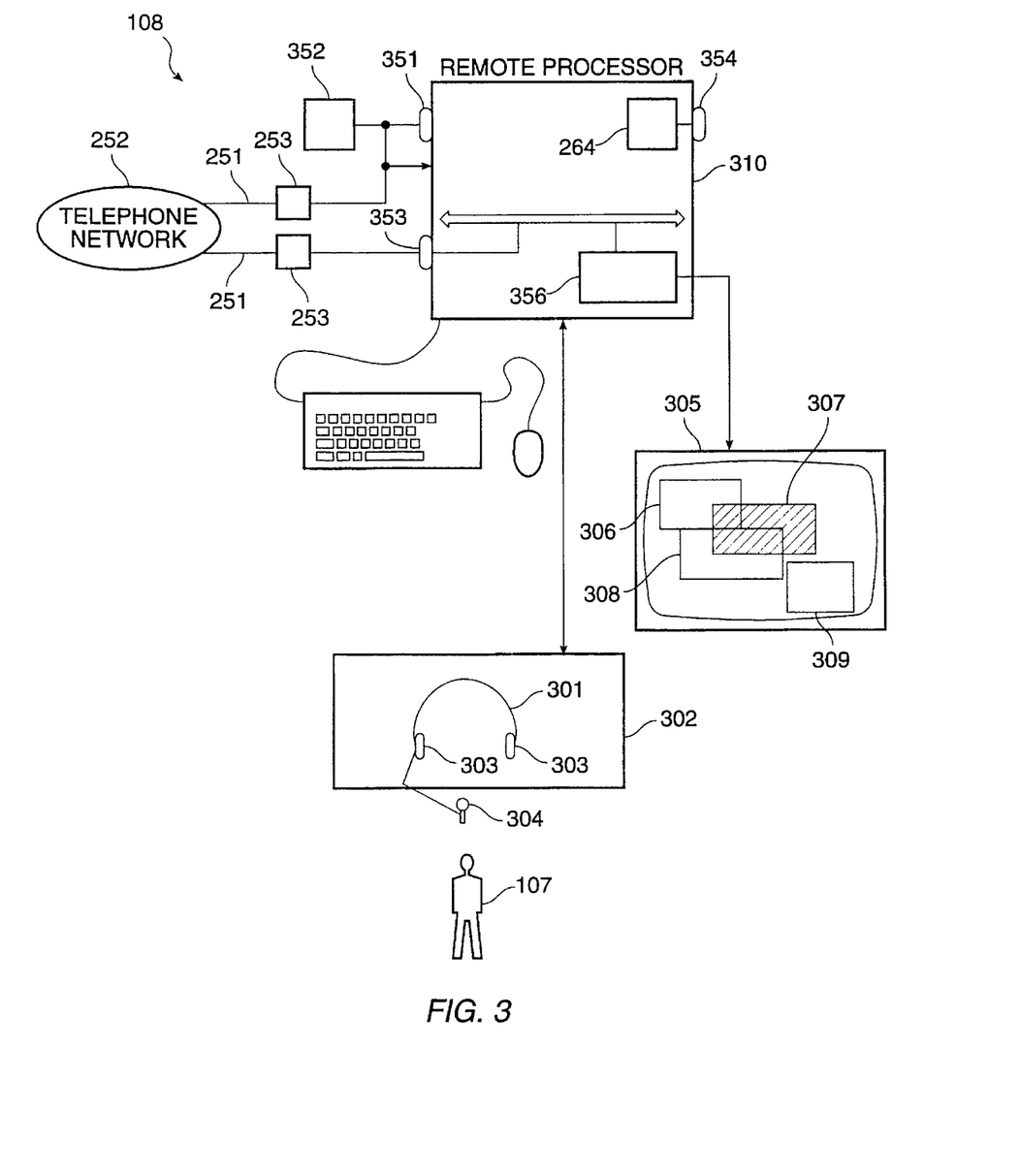
FIG. 3 shows a block diagram of a remote station for a remote system.

FIG. 3 shows a block diagram of a remote station for a remote system.

The remote station 105 comprises an advisor headset 301, including a set of audio and video sensors 302. In a preferred embodiment, the audio and video sensors 302 comprise a set of earphones 303 disposed so the remote advisor 107 can hear and a microphone 304 disposed so the remote advisor 107 can speak into it.

In a preferred embodiment, the advisor headset 301 comprises a set of headgear or a helmet suitable for wearing by the remote advisor 107, having the audio and video sensors 302 attached thereto or embedded therein, in suitable locations relative to the remote advisor's ears, eyes, and mouth. For example, the earphones 303 are preferably disposed near the local operator's ears, and the microphone 304 is preferably disposed near the remote advisor's mouth.

In a preferred embodiment, the earphones 303 and microphone 304 comprise similar products to those used for the earphones 203 and microphone 206.

The remote station 105 comprises a remote monitor 305, including a camera view display 306, a local apparatus control display 307, a topical reference display 308, and a remote station control display 309, such as an icon or menu system. In a preferred embodiment, the remote monitor's displays may be selected, deselected, or resized under control of a software windowing system, such as the "System 7" product, by Apple Corporation, of Cupertino, Calif.

The remote station 105 receives video signals from the local station's camera 204 and displays them on the camera view display 306, receives video and data signals from the local apparatus 109 and displays them on the a local apparatus control display 307, receives topical information from a topical database 312 and displays them on the topical reference display 308.

In a preferred embodiment, the topical database 312 comprises a database of information related to the local apparatus 109, accessed under control of database software or multimedia display software. The database software provides the remote advisor 107 with the capability for searching the database for information related to symptoms discovered for the local apparatus 109, and displaying information related to those and other topics. The remote advisor 107 reviews the information provided by the database software, and may either advise the local operator 104 accordingly, or may transmit the information displayed by the database software to the local station 102 for display on the earphones 203 (for audio information) and heads-up display 205 (for text and video information) for the local operator 104 to review.

In a preferred embodiment, the remote station 105 is coupled to the telephone switching network 252 by means of its own set of telephone links 251 and modems 253.

The remote station 105 comprises a remote processor 310 coupled to the audio and video sensors 302, to the remote monitor 305, and to the communication link 108.

In a preferred embodiment, the remote processor 310 comprises a processor similar to the local processor 211, e.g., a 19 inch rack mounted computer, having at least 16 MB of memory (and preferably at least 32 MB of memory), at least 240 MB of mass storage such as a hard disk, a remote input device 311, and a ThinNet connection, such as the Quadra 660AV/16 product, by Apple Corporation, of Cupertino, Calif. The remote processor 310 couples the audio and video sensors 302 to the communication link 108, performs data compression, error detection and correction for audio and video signals, and other signals, similar to the local processor 211.

However, in an alternative embodiment, the remote processor 310 may comprise a separately mounted processor, an IBM PC compatible processor, or a processor using an Apple Corporation architecture but having a different CPU element such as the Quadra 8100 with a Power PC 604 chip, or a general purpose processor having another architecture. Those skilled in the art would recognize, after perusal of this application, that modification of such an alternative embodiment for the local processor 310 would be workable with the disclosure of the present invention, and would not require any undue invention.

In a preferred embodiment, the remote input device 311 comprises a keyboard and a pointing device (such as a mouse, pen, or trackball), coupled to the remote processor 310, as is known in the art. Input signals from the remote input device 311, such as keystrokes, mouse clicks, mouse drags, or other input, are multiplexed by the remote processor 310 with other signals and coupled to the communication link 108. Recognizing, multiplexing, and transmitting such input signals are all known in the art.

The remote processor 310 controls the remote monitor 305, including the monitor's displays, under control of the software windowing system.

The remote processor 310 multiplexes signals to the local apparatus 109 and from the audio and video sensors 202 onto the communication link 108, similar to the local processor 211. When the communication link 108 comprises a plurality of channels, the remote processor 310 allocates packets and signals to those channels for transmission and receipt. For example, the communication link 108 may comprise two telephone lines 251; the remote processor 310 allocates analog audio signals to one of those two telephone lines 251, and all other signals to the other of those two telephone lines 251, similar to the local processor 211. However, in an alternative embodiment, similar to the local processor 211, the remote processor 211 may allocate signals to one or more channels of the communication link 108 in response to the signals' bandwidth requirements, priority, quality requirements, security or signal integrity requirements, or in response to other factors known in the communication arts.

In a preferred embodiment where there are a plurality of local stations 102, each with its own local processor 211, the remote processor 310 resolves any communication conflicts between local stations 102, by means of communication conflict resolution techniques known in the communication arts.

In a preferred embodiment, the remote processor 310 comprises a first remote serial port 351 coupled to a remote video codec 352 and disposed to couple compressed digitized video signals to the remote video codec 352, and a second remote serial port 353 coupled to one of the modems 253 coupled to one of the telephone links 251. The remote processor 310 couples the video data received at the second remote serial port 353 to the remote video codec 352 by means of the first remote serial port 351. The remote video codec 352 decompresses the video data and returns it to the first remote serial port 351; the decompressed video data is coupled to the remote monitor 305.

In a preferred embodiment, the remote video codec 352 comprises the "Cameo 2000" product, by Compression Labs, Inc., of San Jose, Calif., operating under control of the "Cameo tool" software, also by Compression Labs, Inc., of San Jose, Calif.

In a preferred embodiment, the remote processor 211 comprises a software pseudo driver 264 emulating a third remote serial port 354 (i.e., the software pseudo driver 264 provides a "pseudo serial port"), similar to the local processor 211. When data from the local apparatus 109 is received at the second remote serial port 353, it is coupled to a remote internal bus 355 in the remote processor 211. The data is coupled from the remote internal bus 355 to a remote GPIB control program 356. The data is coupled by the remote GPIB control program 356 to the remote monitor 305 for display to the remote advisor 107.

In a preferred embodiment, the remote GPIB control program 356 comprises the "LabView" software, by National Instruments, Inc., of Austin, Tex.

At the remote processor 310, the remote GPIB control program 356 is used to control the local apparatus 109 by means of the communication link 108 and the local processor 211, not to control a device directly coupled to the remote processor 310. However, in an alternative embodiment, it may be advisable in some applications to provide a duplicate of the local apparatus 109 at the remote processor 310, and to couple a second remote GPIB control program 356 to the duplicate of the local apparatus 109 at the remote processor 310, to enable the remote advisor 107 to perform independent experiments or other operations thereon.

Similarly, when the local processor 211 receives compressed video data at the second local serial port 262, the compressed video data is coupled to the first local serial port 261 and to the local video codec 210 for decompression. The local video codec 210 decompresses the compressed video data and generates decompressed video data coupled to the first local serial port 261. The decompressed video data is coupled to the local internal bus 266 and to the heads-up display 205 in the operator headset 201.

METHODS OF OPERATION

Figure 4:
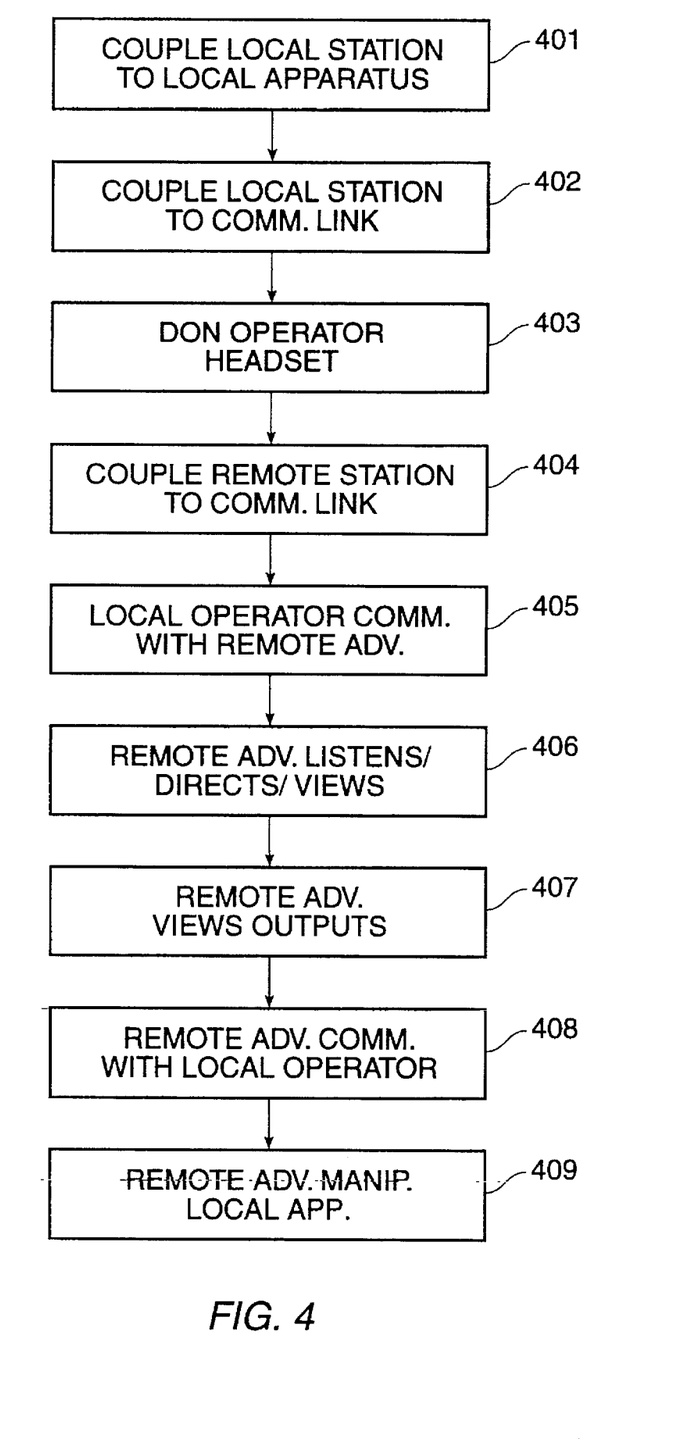
FIG. 4 shows a flow diagram of a method for operating a remote system.

FIG. 4 shows a flow diagram of a method for operating a remote system.

In operation for trouble-shooting the local apparatus 109, the local operator 104 comprises a field engineer or technicians, who generally knows how to operate the local apparatus 109 but need not have specified knowledge relating thereto. The remote advisor 107 comprises a more experienced engineer or expert, who knows both how to operate the local apparatus 109 and also has extensive or specified knowledge relating thereto. In most cases, the local operator 104 performs trouble-shooting tasks with regard to the local apparatus 109 alone. When the local operator 104 requires advice or assistance, the local operator 104 communicates with the remote advisor 107, who directs or suggests actions by the local operator 104 to operate, test, trouble shoot, and possibly repair, the local apparatus 109.

Although this preferred method of operation is disclosed with regard to a technician and an expert, collectively performing the task of trouble-shooting the local apparatus 109, it would be clear to those skilled in the art, after perusal of this application, that there are many alternative tasks that may be performed by the local operator 104, with the assistance of the remote advisor 107, using substantially the same method and system. Moreover, it would be clear to those skilled in the art, after perusal of this application, how to modify the system disclosed herein, and known equipment, to implement such alternative tasks without undue invention.

For example, the following are alternative embodiments of the invention:

1. The local operator 104 may comprise an individual with technical training and knowledge, but lacking managerial or other authority, while the remote advisor 107 may comprise an individual with such authority. This may be a desired form of operation when the local apparatus 109 is expensive or systems depending thereon are critical.

2. The local apparatus 109 may comprise medical equipment or other equipment for monitoring and/or maintaining the health of a patient, such as a pacemaker or a heart-lung device. The local operator 104 may comprise a medically trained person such as a physician or nurse, while the remote advisor 107 may comprise an expert on the technical aspects of the local apparatus 109.

3. The local apparatus 109 may comprise a patient's body, and the operation to be performed may comprise some form of routine examination or procedure. The local operator 104 may comprise a medically trained person such as a physician or nurse, while the remote advisor 107 may comprise a person with additional medical training, such as a physician or a specialist in a particular medical field.

4. The local operator 104 may comprise an individual with physical prowess or other physical skills needed to operate the local apparatus 109, while the remote advisor 107 may comprise an individual with specialized knowledge regarding the local apparatus 109 or the environment in which it is operated. For example, the local operator 104 may comprise an astronaut in a space environment, a diver in an undersea environment, or a pilot in a high-altitude environment, while the remote advisor 107 may comprise a person with scientific or technical skills who is unable to attend personally to the local apparatus 109 (e.g., for medical or safety reasons).

5. The local operator 104 may comprise military or police personnel, while the remote advisor 107 may comprise an officer with greater authority, experience, or training, or a special situations expert such as a psychologist. The local apparatus 109 may comprise the military or police environment and equipment with which military or police personnel perform their duties.

6. The remote advisor 107 may comprise a computer program, such as a database access program, an expert system or other Artificial Intelligence program, or another program configured specifically for the local apparatus 109 in question. For example, the remote advisor 107 may comprise a computer program for automated calibration of the local apparatus 109, where the local apparatus 109 and the connection thereto are configured to allow remote calibration, e.g., by digital setting of calibration potentiometers or other components.

Those skilled in the art will recognize, after perusal of this application, that the alternative embodiments described above are just a sample of many possible embodiments of the invention; that further alternative embodiments of the invention would be readily apparent to those skilled in the art; that such further alternative embodiments would be readily implementable using the apparatus, methods, and other information disclosed herein, without undue invention; and that such further alternative embodiments are within the scope and spirit of the invention.

In a step 401, the local operator 104 couples the local station 102 to the local apparatus 109.

In a step 402, the local operator 104 couples the local station 102 to the communication link 108. In a preferred embodiment, the local operator 104 couples the telephone links 251 to the telephone switching network 252.

In a step 403, the local operator 104 dons the operator headset 201.

In a step 404, the remote advisor 107 couples the remote station 107 to the communication link 108. In a preferred embodiment, the remote advisor 107 couples the remote station's telephone links 351 to the same telephone switching network 252.

In a step 405, the local operator 104 communicates with the remote advisor 107 using the operator headset 201 and the advisor headset 301, coupled by the communication link 108. The local operator 104 may use ordinary speech, similar to a telephone, or may use visual cues that may be seen by the remote advisor 107 using the operator headset 201 and the camera view display 306. For example, the local operator 104 may be unsure of a next step to take in trouble-shooting the local apparatus 109, and may ask the remote advisor 107 for a suggestion.

In a step 406, the remote advisor 107 listens to the local apparatus 109 using the operator headset 201 and the advisor headset 301, coupled by the communication link 108, and views the local apparatus 109, using the operator headset 201 and the camera view display 306, coupled by the communication link 108. The remote advisor 107 may direct the local operator 104 to look at a particular part of the local apparatus 109 so the remote advisor 107 may view that part.

In a step 407, the remote advisor 107 views the outputs of the local apparatus 109 using the local apparatus control display 307. The remote advisor 107 may direct the local operator 104 to alter settings on the local apparatus 109 so the remote advisor 107 may obtain further data on the local apparatus 109.

In a step 408, the remote advisor 107 communicates with the local operator 104 using the operator headset 201 and the advisor headset 301, coupled by the communication link 108. The remote advisor 107 may use ordinary speech, similar to a telephone. For example, the remote advisor 107 may give advice to the local operator 104 for manipulating the local apparatus 109.

In a step 409, the remote advisor 107 manipulates the local apparatus 109 directly using the control signal or data signal feeds. Data obtained from the data signal feeds is preferably returned to the remote advisor 107 for review.

ALTERNATIVE SYSTEM HAVING INTERMEDIATE STATION(S)

Figure 5:
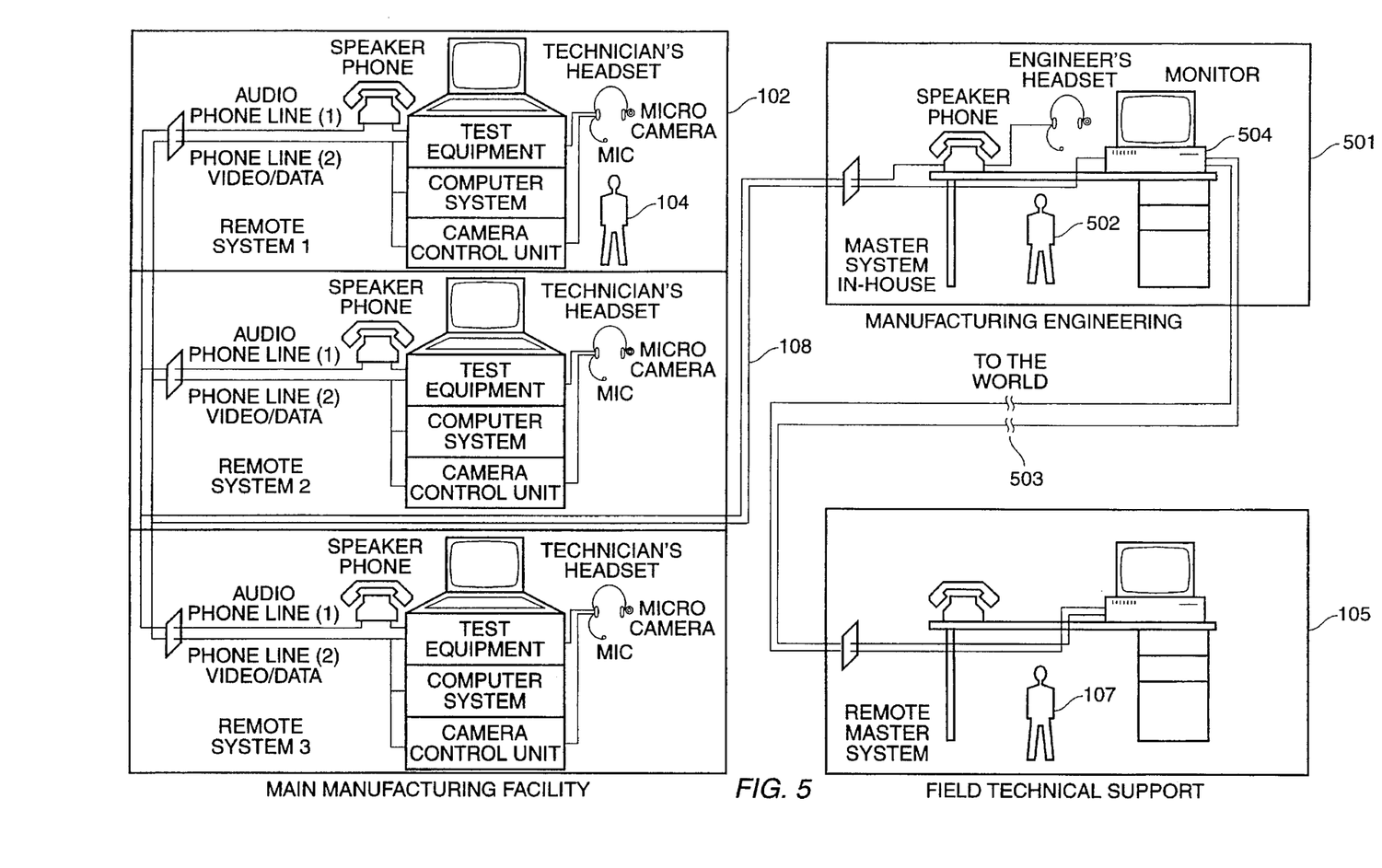
FIG. 5 shows a block diagram of an alternative remote system having at least one intermediate station.

FIG. 5 shows a block diagram of an alternative remote system having at least one intermediate station.

In a preferred embodiment of this alternative system (as distinguished from a preferred embodiment of a standard remote mote system described with regard to FIGS. 1, 2, 3, and 4), the local station 102 is coupled to the intermediate station 501 and the local operator 104 is advised by the intermediate advisor 502; the intermediate station 501 is coupled to the remote station 105 and the intermediate advisor 502 is advised by the remote advisor 107. The local operator 104 may also be advised by the remote advisor 107 directly.

Audio, visual, and data signals from the operator headset 201 and from the local apparatus 109 are coupled to the intermediate station 501 and the intermediate advisor 502, similar to the coupling of audio, visual, and data signals from the operator headset 201 and from the local apparatus 109 to the remote station 105 and the remote advisor 107 in the preferred embodiment of a standard remote system.

Audio, visual, and data signals from the operator headset 201 and from the intermediate station 501 are also coupled to the remote station 105 and the remote advisor 107, similar to the coupling of audio, visual, and data signals from the operator headset 201 and from the local apparatus 109 to the remote station 105 and the remote advisor 107 in the preferred embodiment of a standard remote system.

The intermediate station 501 is constructed similarly to the remote station 105 of the preferred standard embodiment. The communication link 108 couples the local station 102 and the intermediate station 501, and a second communication link 503 couples the intermediate station 501 to the remote station 105. The intermediate station 501 comprises an intermediate processor 504, which performs the functions (assigned to the remote processor 310 in the preferred standard embodiment) of receiving information transmitted from the local station 102 to the intermediate station 501 and transmitting information from the intermediate station 501 to the local station 102. The intermediate processor 504 also performs the functions (assigned to the local processor 211 in the preferred standard embodiment) of transmitting information from the intermediate station 501 to the remote station 105 and receiving information transmitted from the remote station 105 to the intermediate station 501.

The intermediate processor 504 also routes information from the local station 102 to the remote station 105, and from the remote station 105 to the local station 102, without delivering that information to the intermediate operator 502, when that information is labeled by the local station 102 or by the remote station 105 as being intended for nondelivery to the intermediate operator 502. This allows the local operator 104 at the local station 102 and the remote advisor 107 at the remote station 105 to communicate directly without necessarily involving the intermediate operator 502. Routing information between nodes in a network, such as between the local station 102 and the remote station 105, by means of an intermediate node, such as the intermediate station 501, is known in the art.

METHODS OF OPERATION OF ALTERNATIVE SYSTEM

Figure 6:
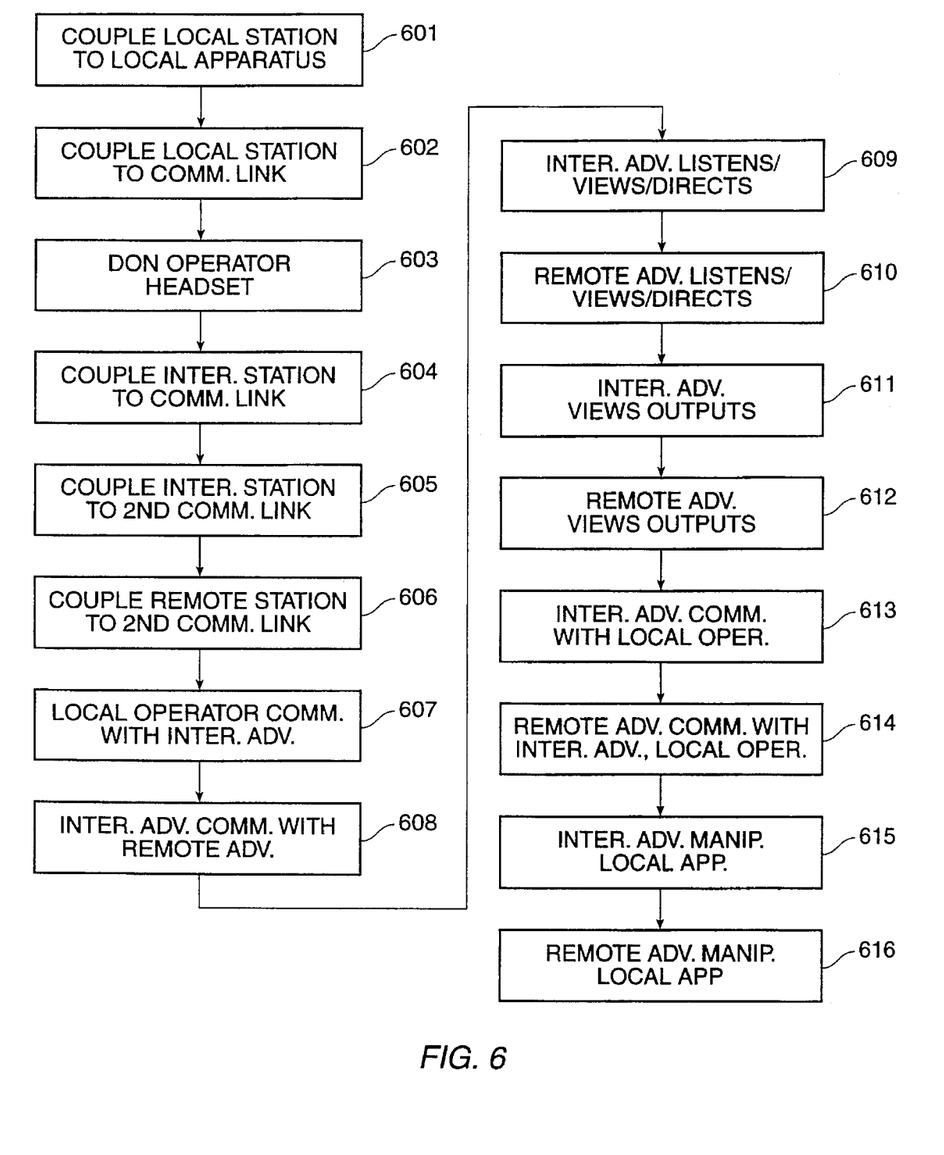
FIG. 6 shows a flow diagram of a method for operating an alternative remote system.

FIG. 6 shows a flow diagram of a method for operating an alternative remote system.

In this alternative embodiment, steps 401 through 409 (FIG. 4) may be substantially duplicated by either the intermediate advisor 502 or the remote advisor 107, as described herein:

In a step 601, similar to the step 401, the local operator 104 couples the local station 102 to the local apparatus 109.

In a step 602, similar to the step 402, the local operator 104 couples the local station 102 to the communication link 108. In a preferred embodiment, the local operator 104 couples the telephone links 251 to the telephone switching network 252.

In a step 603, similar to the step 403, the local operator 104 dons the operator headset 201.

In a step 604, similar to the step 404, the intermediate advisor 502 couples the intermediate station 501 to the communication link 108. In a preferred embodiment, the intermediate advisor 502 couples a set of intermediate station telephone links, similar to the remote station's telephone links 351, to the same telephone switching network 252.

In a step 605, the intermediate advisor 502 couples the intermediate station 501 to the second communication link 503 between the intermediate station 501 and the remote station 105.

In a step 606, similar to the step 404, the remote advisor 107 couples the remote station 107 to the second communication link 503. In a preferred embodiment, the remote advisor 107 couples the remote station's telephone links 351 to the same telephone switching network 252.

In a step 607, similar to the step 405, the local operator 104 communicates with the intermediate advisor 502 using the operator headset 201 and an intermediate advisor headset like the advisor headset 301, coupled by the communication link 108. The local operator 104 may use ordinary speech, similar to a telephone, or may use visual cues that may be seen by the intermediate advisor 502 using the operator headset 201 and an intermediate camera view display like the remote camera view display 306. For example, the local operator 104 may be unsure of a next step to take in trouble-shooting the local apparatus 109, and may ask the intermediate advisor 107 for a suggestion.

In a step 608, similar to the step 405, the intermediate advisor 502 may similarly communicate with the remote advisor 107, or the local operator 104 may similarly communicate with the remote advisor 107.

In a step 609, similar to the step 406, the intermediate advisor 107 listens to the local apparatus 109 using the operator headset 201 and an intermediate operator headset like the remote advisor headset 301, coupled by the communication link 108, and views the local apparatus 109, using the operator headset 201 and the intermediate camera view display like the remote camera view display 306, coupled by the communication link 108. The intermediate advisor 107 may direct the local operator 104 to look at a particular part of the local apparatus 109 so the intermediate advisor 107 may view that part.

In a step 610, similar to the step 406, the remote advisor 107 may similarly direct the intermediate advisor 502 as in the step 609, or the remote advisor 107 may similarly direct the local operator 104 as in the step 609.

In a step 611, similar to the step 407, the intermediate advisor 107 views the outputs of the local apparatus 109 using an intermediate control display like the control display 307. The intermediate advisor 107 may direct the local operator 104 to alter settings on the local apparatus 109 so the intermediate advisor 107 may obtain further data on the local apparatus 109.

In a step 612, similar to the step 406, the remote advisor 107 may similarly view outputs and direct the intermediate advisor 502 as in the step 611, or the remote advisor 107 may similarly view outputs and direct the local operator 104 as in the step 611.

In a step 613, similar to the step 408, the intermediate advisor 107 communicates with the local operator 104 using the operator headset 201 and an intermediate advisor headset like the remote advisor headset 301, coupled by the communication link 108. The intermediate advisor 107 may use ordinary speech, similar to a telephone. For example, the intermediate advisor 107 may give advice to the local operator 104 for manipulating the local apparatus 109.

In a step 614, similar to the step 408, the remote advisor 107 may similarly communicate with and advise the intermediate advisor 502 as in the step 613, or the remote advisor 107 may similarly communicate with and advise the local operator 104 as in the step 614.

In a step 615, similar to the step 409, the intermediate advisor 107 manipulates the local apparatus 109 directly using the control signal or data signal feeds. Data obtained from the data signal feeds is preferably returned to the intermediate advisor 502 and the remote advisor 107 for review.

In a step 616, similar to the step 409, the remote advisor 107 may similarly manipulate the local apparatus 109 directly using the control signal or data signal feeds as in the step 615. Data obtained from the data signal feeds is preferably returned to the intermediate advisor 502 and the remote advisor 107 for review.

ALTERNATIVE EMBODIMENTS

Although preferred embodiments are disclosed herein, many variations are possible which remain within the concept, scope, and spirit of the invention, and these variations would become clear to those skilled in the art after perusal of this application.

We claim:

1. A system, comprising
   a local station coupled to a local apparatus disposed to be operated by a local operator, said local station comprising an audio sensor, a video sensor, a control signal feed and a data signal feed coupled to said local apparatus, and an audio receiver;
   a remote station disposed to be operated by a remote advisor, said remote station comprising an audio sensor, a monitor, a processor, an audio receiver, and a transducer for controls for said local apparatus;
   a communication link coupled to said local station and said remote station;
   wherein said local station audio sensor and said remote station audio receiver are disposed to recover local sound and deliver said local sound to said remote advisor, said local station video sensor and said remote station monitor are disposed to recover local images and deliver said local images to said remote advisor, and said remote station audio sensor and said local station audio receiver are disposed to recover remote sound and deliver said remote sound to said local operator; and
   wherein said local station control signal feed and data signal feed and said remote station monitor are disposed to recover control signals and data signals from said local apparatus and deliver said control signals and data signals to said remote station monitor, and are disposed to recover control signals from said remote station transducer and deliver said control signals to said remote station local apparatus;
   whereby said remote advisor may view and hear stimuli available to said local operator, said local operator and said remote advisor are capable of communicating, and said remote advisor may view and directly control said local apparatus.

2. A system as in claim 1, comprising a data compression device coupled to said communication link.

3. A system as in claim 1 wherein said local station and said remote station are physically separated by a substantial distance.

4. A system as in claim 1, wherein said remote station comprises a database.

5. As system as in claim 1, wherein at least one of said local station and remote station comprises a processor disposed to dynamically couple or decouple said communication link, whereby said local station control signal feed and data signal feed and said control signals from said remote station transducer are deliverable using said dynamically coupled or decoupled communication link.

6. A system as in claim 1, wherein said communication link comprises at least one telephone connection, transmitter and receiver at said local station, and transmitter and receiver at said remote station, said transmitters and receivers being disposed to dynamically couple or decouple said telephone connection; whereby said local station control signal feed and data signal feed and said control signals from said remote station transducer are deliverable using said dynamically coupled or decoupled telephone connection.

7. A system, comprising
   a local station coupled to a local apparatus disposed to be operated by a local operator, said local station comprising an audio sensor, a video sensor, a control signal feed and a data signal feed coupled to said local apparatus, and an audio receiver;
   an intermediate station disposed to be operated by an intermediate advisor, said intermediate station comprising an audio sensor, a video sensor, and an audio receiver;
   a remote station disposed to be operated by a remote advisor, said remote station comprising an audio sensor, a monitor, a processor, and an audio receiver;
   a first communication link coupled to said local station and said intermediate station; and
   a second communication link coupled to said intermediate station and said remote station;
   wherein said local station audio sensor and said remote station audio receiver are disposed to recover local sound and deliver said local sound to said intermediate advisor, said local station video sensor and said remote station monitor are disposed to recover local images and deliver said local images to said intermediate advisor, and said intermediate station audio sensor and said local station audio receiver are disposed to recover intermediate sound and deliver said intermediate sound to said local operator;
   wherein said intermediate station audio sensor and said remote station audio receiver are disposed to recover intermediate sound and deliver said intermediate sound to said remote advisor, said intermediate station video sensor and said remote station monitor are disposed to recover intermediate images and deliver said intermediate images to said remote advisor, and said remote station audio sensor and said intermediate station audio receiver are disposed to recover remote sound and deliver said remote sound to said intermediate operator; and
   wherein said local station control signal feed and data signal feed and said intermediate station monitor are disposed to recover control signals and data signals from said local apparatus and deliver said control signals and data signals to said intermediate station monitor;
   wherein said local station control signal feed and data signal feed and said remote station monitor are disposed to recover control signals and data signals from said local apparatus and deliver said control signals and data signals to said remote station monitor;
   whereby said intermediate advisor and said remote advisor may view and hear stimuli available to said local operator, said local operator and said intermediate advisor are capable of communicating, said intermediate advisor and said remote advisor are capable of communicating, and said intermediate advisor and said remote advisor may view and control said local apparatus.

8. A system as in claim 7, comprising a data compression device coupled to at least one of said first or second communication link.

9. A system as in claim 7, comprising at said intermediate station a transducer for controls for said local apparatus, disposed so that said intermediate advisor is capable of directly controlling said local apparatus.

10. A system as in claim 7, comprising at said remote station a transducer for controls for said local apparatus, disposed so that said remote advisor is capable of directly controlling said local apparatus.

11. A system as in claim 7, wherein said local station and said intermediate station are physically separated by a substantial distance.

12. A system as in claim 7, wherein said local station and said remote station are physically separated by a substantial distance.

13. A system as in claim 7, wherein at least one of said intermediate station or said remote station comprises a database.

14. A method, comprising coupling a local station to a local apparatus;

operating said local apparatus and said local station by a local operator;

operating a remote station by a remote advisor;

recovering local sound and delivering said local sound to said remote advisor, recovering local images and delivering said local images to said remote advisor, and recovering remote sound and delivering said remote sound to said local operator;

recovering control signals and data signals from said local apparatus and delivering said control signals and data signals to said remote station monitor; and providing at said remote station a transducer for controls for said local apparatus, and delivering signals from said transducer to said local apparatus;

whereby said remote advisor may view and hear stimuli available to said local operator, said local operator and said remote advisor are capable of communicating, and said remote advisor may view and directly control said local apparatus.

15. A method as in claim 14, comprising compressing data before coupling said data to said communication link and decompressing data after recovering said data from said communication link.

16. A method as in claim 14, comprising physically separating said local station and said remote station by a substantial distance.

17. A method as in claim 14, comprising providing a database at said remote station.

18. A method as in claim 14, wherein said local operator comprises an individual with limited authority, and wherein said remote advisor comprises an individual with relatively more extensive authority.

19. A method as in claim 14, wherein said local operator comprises an individual with limited training, and wherein said remote advisor comprises an individual with relatively more extensive training.

20. As method as in claim 14, comprising the step of dynamically coupling or decoupling said communication link, whereby said local station control signal feed and data signal feed and said control signals from said remote station transducer are deliverable using said dynamically coupled or decoupled communication link.

* * * * *

UNITED STATES PATENT AND TRADEMARK OFFICE
CERTIFICATE OF CORRECTION

PATENT NO. : 5,619,183
DATED : April 8, 1997
INVENTOR(S) : Richard C. Ziegra and Steven Christopher Hurtado It is certified that error appears in the above-indentified patent and that said Letters Patent is hereby corrected as shown below:

Column 12, line 49: please delete the text "mote".

Signed and Sealed this

Eighth Day of July, 1997

Attest:

BRUCE LEHMAN

*Attesting Officer*  *Commissioner of Patents and Trademarks*